No. 786,073. PATENTED MAR. 28, 1905.
S. P. WALSH.
SPEED INDICATOR.
APPLICATION FILED JAN. 13, 1905.

WITNESSES
A. T. Palmer
H. W. Ladd

INVENTOR
Stafford P. Walsh
BY
A. Spencer
ATT'Y.

No. 786,073.

Patented March 28, 1905.

UNITED STATES PATENT OFFICE.

STAFFORD P. WALSH, OF SAN FRANCISCO, CALIFORNIA, ASSIGNOR TO L. S. STARRETT CO., OF ATHOL, MASSACHUSETTS, A CORPORATION OF MASSACHUSETTS.

SPEED-INDICATOR.

SPECIFICATION forming part of Letters Patent No. 786,073, dated March 28, 1905.

Application filed January 13, 1905. Serial No. 240,892.

*To all whom it may concern:*

Be it known that I, STAFFORD P. WALSH, of San Francisco, in the county of San Francisco and State of California, have invented certain new and useful Improvements in Speed-Indicators, of which the following is a specification.

This invention is in the nature of an improvement upon the speed-indicator set forth in the United States Patent No. 580,432, granted April 13, 1897, to Laroy S. Starrett, of Athol, Massachusetts. In said patent the flat body or casing inclosed a worm gear-wheel, rotatable with a central hub upon a circular flange of the casing by the engagement of a threaded portion of the spindle with said gearwheel. The casing had a fixed front plate with graduated marginal ring and a smaller indicating-disk parallel to said plate rotating with said wheel and held by an axial screw to the outer end of said hub. By slackening this screw such disk could be adjusted or set back to a given starting-point when desired.

By my improvement I interpose a curved annular spring between said disk and the head of the rotatable hub, so that the disk is driven by a yielding friction only, and it may be held from rotation by the operator until the desired moment by compressing said spring until the disk bears upon the flat stationary plate. With this construction the disk may be adjusted or set as desired without loosening the axial screw.

Figure 1:
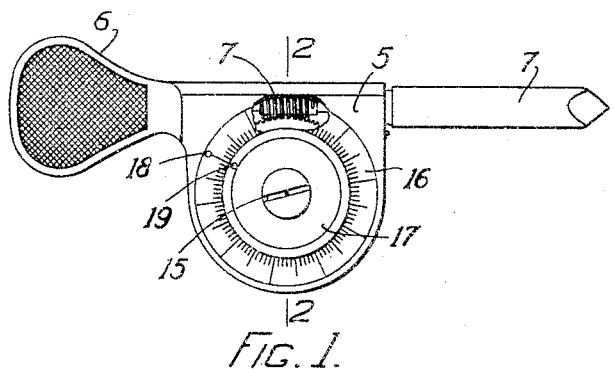
Figures 2, 3:
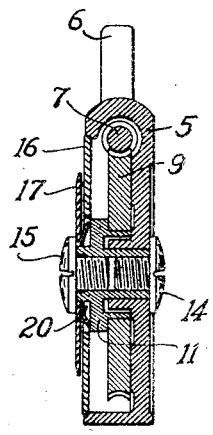
Figure 4:

In the drawings, Figure 1 is a plan of the improved tool, part being broken out to show the gearing. Fig. 2 is a transverse section on line 2 2 of Fig. 1, the scale being enlarged. Fig. 3 is a sectional view of the parts detached. Fig. 4 is a perspective view of the spring.

The general construction, being similar to that set forth in the Starrett patent referred to, will be briefly stated.

The casing 5 is preferably formed integral with the handle 6 and has a cylindrical perforation in line with the handle to receive the threaded portion of the spindle 7, a socket 8 forming its inner end bearing. The free outer end of the spindle has an angular taper, as usual, to engage the end of a rotating shaft.

The flat casing 5 is chambered to receive the broad worm gear-wheel 9, which engages edgewise with the threaded spindle 7. This casing has integral with its flat back an inwardly-extending annular flange 10, which enters an annular recess in and forms a bearing for the hollow hub 11, upon which the wheel 9 is secured for rotation. (See Figs. 2 and 3.)

The hub 11 has a circular flange 12, which carries wheel 9, and is also formed with a central tubular or sleeve-like portion 13, which fits easily within flange 10 of the casing and projects somewhat from the front end of the hub also. This tube or sleeve is internally threaded to receive the short axial screws 14 and 15, which by their broad heads hold the various parts together.

The front plate 16 is secured marginally to the casing and is cut away centrally to expose the entire end of hub 11. The rotatable indicating-disk 17 overlaps the plate 16, but leaves the graduated ring thereon uncovered. Said disk has a central opening into which the front end of sleeve 13 extends for free rotation. A small protuberance 18 is formed on ring 16 at the zero-point, and a corresponding one, 19, on the rotatable disk facilitates setting it properly and noting a complete rotation.

The friction-spring 20 of my improvement is preferably a curved annulus of elastic sheet metal, as shown in Figs. 2, 3, and 4, and is introduced into the annular space between hub 11 and disk 17 within the central opening of the plate or ring 16. This spring normally holds disk 17 free from contact with said plate or ring and elastically pressed outwardly against the head of screw 15, which rotates slowly with wheel 9 and hub 11; but when said disk is pressed inwardly by the operator it loses contact with said screw-head and bears frictionally against the stationary plate. Thus by such pressure rotation of the indicating-disk may be stopped at the end of a given time, or it may be held stationary until the desired moment arrives. In any case the readjustment of the disk is made simpler than before.

I claim as my invention—

1. In a speed-indicator, an inclosing case, a projecting, rotatable spindle and a worm gear-wheel engaging with the threaded spindle, in combination with a stationary front plate or ring graduated near its margin, a rotatable indicating-disk overlapping the inner portion of said plate and normally held free from contact therewith, and an inclosed spring tending to separate said disk and plate, but compressible to permit their contact, for the purpose set forth.

2. The recessed casing 5, the threaded spindle 7 and worm gear-wheel 9 engaging each other therein, the annular flange 10, integral with said casing, and the internally-threaded hub 11 carrying said gear-wheel and having a tubular portion extending through the case, within said flange, in combination with the graduated ring 16 secured marginally to the casing, the rotatable indicating-disk 17 and the annular spring 20, covering the head of hub 11, and yielding to permit contact of said disk and ring, for the purpose set forth.

In testimony whereof I have affixed my signature in presence of two witnesses.

STAFFORD P. WALSH.

Witnesses:
W. E. WALSH,
R. L. APPLE.